United States Patent Office 3,392,307
Patented July 9, 1968

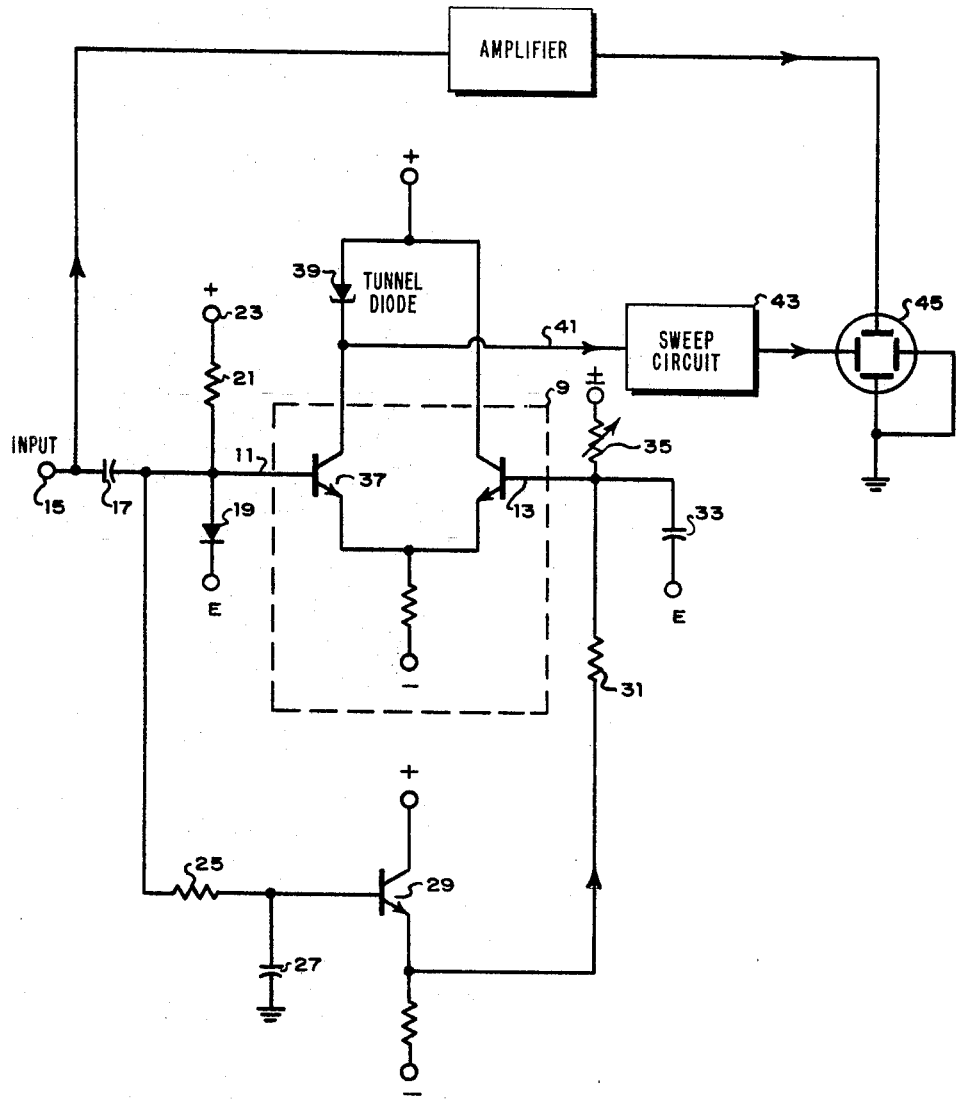

3,392,307
TRIGGER CIRCUIT HAVING A TRIGGER LEVEL WHICH VARIES WITH APPLIED SIGNAL AMPLITUDE
Richard E. Monnier, Sunnyvale, Calif., assignor to Hewlett-Packard Company, Palo Alto, Calif., a corporation of California
Filed Apr. 12, 1965, Ser. No. 447,461
2 Claims. (Cl. 315—25)

ABSTRACT OF THE DISCLOSURE

A trigger circuit for use in oscilloscopes and the like to trigger a sweep circuit on the input waveform at a selected level which is automatically varied with the amplitude of the input waveform by utilizing the average value of the waveform. The instantaneous value of the waveform is compared with a portion of its average value to trigger the oscilloscope sweep signal.

A trigger circuit of this type obviates the need for a manual adjustment to select the level at which a sweep circuit will be actuated. This is particularly important in special purpose television monitors where it is highly desirable that the monitor automatically display a received waveform of widely variable transmission quality whenever such waveform is present. Thus with the present circuit the sweep triggering is not affected by faulty signal transmission which may cause fluctuations in the shape or amplitude of the received waveform. The monitor thus continues to display the input waveform during such fluctuations so that careful examination may be made of the faulty signal transmission which might otherwise cause a loss of synchronous operation in a conventional monitor oscilloscope having a manually adjustable trigger circuit.

---

It is an object of the present invention to provide a circuit for automatically triggering the sweep signal of an oscilloscope in response to the applied waveform attaining a selected value related to its amplitude.

It is another object of the present invention to provide a circuit for triggering the sweep signal of an oscilloscope at a voltage which is related to the average value of an applied waveform.

In accordance with the illustrated embodiment of the present invention, a comparator, is connected to receive a waveform for comparison with a portion of its average value to produce an output for highly stable and reliable triggering of a sweep signal, independent of changes in wave shape and amplitude.

Other and incidental objects of the present invention will be apparent from a reading of this specification and an inspection of the accompanying drawing which shows a schematic diagram of the circuit of the present invention.

Referring to the drawing, there is shown a comparator 9 including a conventional transistor differential amplifier having a pair of inputs 11 and 13. Input signal on terminal 15 is A.C. coupled through capacitor 17 to input 11 which is clamped through diode 19 to a selected voltage E. Resistor 21 connected between the positive supply terminal 23 and the diode 19 maintains the capacitor charged. Thus for the diode connection shown, input signal applied to input 11 of the comparator varies negatively below voltage E.

At the same time, the input signal at terminal 15 is A.C. coupled through capacitor 17 to the low pass filter including series resistor 25 and shunt capacitor 27. This filter acts as an averaging circuit for applying to the base electrode of transistor 29 a steady voltage equal to the average value of the signal on input 11. Thus, for example, if E is −10 volts, then a sine wave input signal of 8 volt peak-to-peak amplitude appears at input 11 as a signal which varies from −10 volts to −18 volts and produces a substantially steady signal of −14 volts on the base electrode of transistor 29. Transistor 29 operating in the emitter follower configuration applies the steady voltage to input 13 of comparator 9 through the low pass filter including series resistor 31 and shunt capacitor 33. The average value of the input signal thus appear at input 13 as the reference voltage against which the input signal itself is compared in comparator 9. In the above example, this reference voltage is −14 volts and represents the zero crossing of the sine wave input. For pulse waveforms of one polarity, the average value on which the comparator triggers approaches the voltage E as the duty cycle of the pulses increases. It should be appreciated that a peak detector including a diode in place of resistor 25 or an RMS detector including a thermocouple or a square law detector or any such conventional detector circuits may be used in place of the average detector shown. Also, variable resistor 35 may be connected to input 13 to alter the reference voltage from the true detected value where necessary to overcome noise or the like.

When the signals on the two inputs 11 and 13 of comparator 9 approach parity, the amplified change in current in collector of transistor 37 for a small change in base signal causes the tunnel diode 39 to switch operating states, thus producing an output of one polarity on line 41. As the two signals on inputs 11 and 13 approach parity in the opposite direction during the return portion of the input signal waveform, the change in current in the collector of transistor 37 again causes the tunnel diode 39 to switch operating states, thus producing an output of opposite polarity on line 41. These outputs are applied to the sweep circuit 43 of an oscilloscope to maintain synchronized operation of the input signal and sweep signal applied to the deflection systems of a cathode-ray tube 45. The circuit of the present invention thus provides reliable triggering of a sweep signal under conditions of varying input signal waveform and amplitude.

I claim:
1. A signalling circuit for operation on an input signal and comprising:
   a comparator having an output and a pair of inputs;
   circuit means including a capacitor connected to one input of said comparator for applying thereto alternating components of the input signal;
   a source of reference potential;
   a clamping circuit connected between the common junction of the capacitor and one input of the comparator and the source of reference potential; and
   a circuit connected to receive the input signal for applying to the other input of said comparator a steady signal having an amplitude related to the average value of the input signal.
2. A signalling circuit for an oscilloscope having a cathode ray tube including electron beam deflecting means, the circuit comprising:
   a sweep signal generator connected to said deflecting means for sweeping the electron beam in one plane in response to a control signal applied to said generator;
   comparator means having a pair of inputs and having an output connected to apply control signals to said generator in response to signals applied to the inputs attaining a predetermined relationship;
   capacitive means coupling the A.C. component only of an input signal for the oscilloscope to one input of said comparator;
   a source of reference potential;

a unidirectional conduction element connected between said one input and said source for clamping said one input to said reference potential;

a signal detector connected to receive the input signal for producing a steady voltage related to the long-term average value of the input signal; and means connected to another input of said comparator for applying the steady signal thereto.

References Cited

UNITED STATES PATENTS 2,952,811  9/1960  Carr _____ 328—149

RICHARD A. FARLEY, *Primary Examiner.*

RODNEY D. BENNETT, *Examiner.*

T. H. TUBBESING, *Assistant Examiner.*